United States Patent
Iannuzzi et al.

(10) Patent No.: US 12,265,959 B2
(45) Date of Patent: *Apr. 1, 2025

(54) SYSTEM AND METHOD FOR GENERATING NOTIFICATIONS BASED ON DIGITAL WALLET PASS DATA

(71) Applicant: The Toronto-Dominion Bank, Toronto (CA)

(72) Inventors: Davide Iannuzzi, North York (CA);
Jeffrey MacDonald, Ottawa (CA);
Neha Dipna Kalwani, Toronto (CA);
Aileen Kheraj, North York (CA)

(73) Assignee: The Toronto-Dominion Bank, Toronto (CA)

( * ) Notice: Subject to any disclaimer, the term of this patent is extended or adjusted under 35 U.S.C. 154(b) by 146 days.

This patent is subject to a terminal disclaimer.

(21) Appl. No.: 18/337,586

(22) Filed: Jun. 20, 2023

(65) Prior Publication Data

US 2023/0334474 A1    Oct. 19, 2023

Related U.S. Application Data

(63) Continuation of application No. 17/192,365, filed on Mar. 4, 2021, now Pat. No. 11,720,886.

(51) Int. Cl.
*G06Q 40/00*    (2023.01)
*G06Q 20/06*    (2012.01)
(Continued)

(52) U.S. Cl.
CPC ..... *G06Q 20/3672* (2013.01); *G06Q 20/0658* (2013.01); *G06Q 20/349* (2013.01);
(Continued)

(58) Field of Classification Search
CPC ........... G06Q 20/3672; G06Q 20/0658; G06Q 20/349; G06Q 20/3678; G06Q 20/387;
(Continued)

(56) References Cited

U.S. PATENT DOCUMENTS

| 10,115,088 B2 | 10/2018 | Laracey |
| 10,235,692 B2 | 3/2019 | Artman et al. |

(Continued)

FOREIGN PATENT DOCUMENTS

| CA | 2919047 | 2/2017 |
| KR | 20170024720 | 3/2017 |
| WO | 2015016780 | 2/2015 |

OTHER PUBLICATIONS

He, Xiaojian (A Novel Cryptocurrency Wallet Management Scheme Based on Decentralized Multi-Constrained Derangement; https://ieeexplore.ieee.org/stamp/stamp.jsp?arnumber=8937472, Dec. 2019) (Year: 2019).*

(Continued)

*Primary Examiner* — Bruce I Ebersman
*Assistant Examiner* — Mark H Gaw
(74) *Attorney, Agent, or Firm* — Rowand LLP

(57) ABSTRACT

A server computer system comprises a communications module; a processor coupled with the communications module; and a memory coupled to the processor and storing processor-executable instructions which, when executed by the processor, configure the processor to receive, via the communications module and from a computing device, a signal including digital wallet pass data; store the digital wallet pass data in association with an account; monitor location data and data associated with a value card account to identify a notification event; responsive to identifying the notification event, generate a notification based on the digital wallet pass data; and send, via the communication module and to the computing device, a signal causing the computing device to display the notification.

20 Claims, 9 Drawing Sheets

(51) Int. Cl.
  *G06Q 20/34*   (2012.01)
  *G06Q 20/36*   (2012.01)
  *G06Q 20/38*   (2012.01)
  *G06Q 20/40*   (2012.01)
(52) U.S. Cl.
  CPC ....... *G06Q 20/3678* (2013.01); *G06Q 20/387* (2013.01); *G06Q 20/4015* (2020.05); *G06Q 20/405* (2013.01); *G06Q 20/4093* (2013.01)
(58) Field of Classification Search
  CPC ............. G06Q 20/4015; G06Q 20/405; G06Q 20/4093
  See application file for complete search history.

(56) References Cited

U.S. PATENT DOCUMENTS

| | | | |
|---|---|---|---|
| 10,325,250 | B2 | 6/2019 | Pugh et al. |
| 10,332,079 | B2 | 6/2019 | Van Os et al. |
| 10,430,819 | B2 | 10/2019 | Robeen |
| 10,540,675 | B2 | 1/2020 | Tietzen et al. |
| 10,846,746 | B2 | 11/2020 | Windmueller |
| 2012/0158589 | A1 | 6/2012 | Katzin et al. |
| 2012/0185321 | A1 | 7/2012 | Lal |
| 2013/0191213 | A1* | 7/2013 | Beck ................. G06Q 30/0207 705/14.64 |
| 2013/0282468 | A1 | 10/2013 | Michael |
| 2014/0006126 | A1 | 1/2014 | Mysen et al. |
| 2014/0019352 | A1 | 1/2014 | Shrivastava |
| 2014/0207680 | A1 | 7/2014 | Rephlo |
| 2015/0227890 | A1* | 8/2015 | Bednarek ........... G06Q 10/0833 705/26.81 |
| 2015/0348018 | A1 | 12/2015 | Campos et al. |
| 2015/0379549 | A1* | 12/2015 | Hwang .............. G06Q 30/0226 705/14.27 |
| 2017/0024759 | A1 | 1/2017 | Taneja et al. |
| 2017/0178095 | A1 | 6/2017 | Mathew et al. |
| 2018/0295564 | A1* | 10/2018 | Madan ................ H04L 63/0861 |
| 2019/0034955 | A1 | 1/2019 | Kim |
| 2019/0244192 | A1 | 8/2019 | Katzin et al. |
| 2019/0318332 | A1 | 10/2019 | Whelan et al. |
| 2019/0340604 | A1 | 11/2019 | Nadella et al. |
| 2019/0370786 | A1 | 12/2019 | Kasul et al. |
| 2020/0013031 | A1* | 1/2020 | Goga ................... G06Q 20/102 |
| 2020/0019940 | A1 | 1/2020 | Torres |
| 2020/0211047 | A1 | 7/2020 | Van Os et al. |
| 2020/0302469 | A1 | 9/2020 | Postrel |
| 2020/0334692 | A1* | 10/2020 | Chen ...................... G06Q 20/20 |

OTHER PUBLICATIONS

Redline Marketing & Dezign; https://redlinemarketingco.com/proximity-mobile-marketing/; Published in: Redline Marketing & Dezign; 2020.

He at al.: "A Novel Cryptocurrency Wallet Management Scheme Based on Decentralized Multi-Constrained Derangement", http://ieeexplore.ieee.org/stamp/stamp.jsp?arnumber=8937472, dated Dec. 2019.

* cited by examiner

SYSTEM AND METHOD FOR GENERATING NOTIFICATIONS BASED ON DIGITAL WALLET PASS DATA

CROSS-REFERENCE TO RELATED APPLICATIONS

This application is a continuation of U.S. patent application Ser. No. 17/192,365, filed on Mar. 4, 2021, the entire contents of which are incorporated herein by reference.

TECHNICAL FIELD

The present application relates to digital wallets and, more particularly, to systems and methods for generating notifications based on digital wallet pass data.

BACKGROUND

Digital wallets or digital wallet applications often contain one or more digital payment cards that can be used for processing payments. Digital wallets may also contain digital passes such as for example loyalty point cards, gift cards, etc.

Users may forget or otherwise be unaware of what digital wallet passes are stored in their digital wallet.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
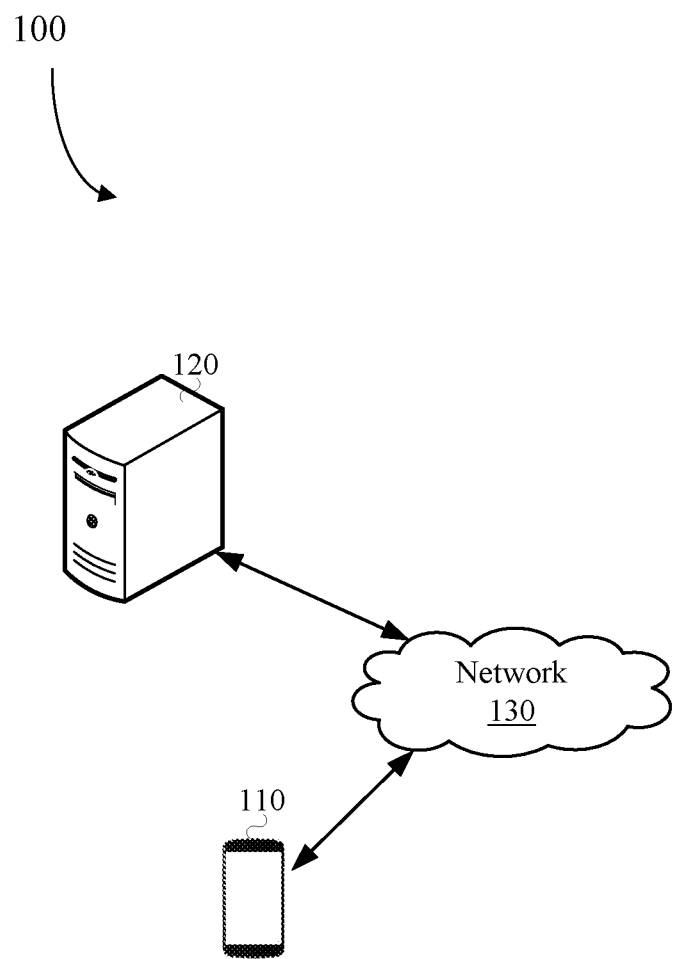
FIG. 1 is a schematic operation diagram illustrating an operating environment of an example embodiment.

In one aspect there is provided a server computer system comprising a communications module; a processor coupled with the communications module; and a memory coupled to the processor and storing processor-executable instructions which, when executed by the processor, configure the processor to receive, via the communications module and from a computing device, a signal including digital wallet pass data; store the digital wallet pass data in association with an account; monitor location data and data associated with a value card account to identify a notification event; responsive to identifying the notification event, generate a notification based on the digital wallet pass data; and send, via the communication module and to the computing device, a signal causing the computing device to display the notification.

In one or more embodiments, the processor-executable instructions, when executed by the processor, configure the processor to engage an application programming interface to analyze at least one of the location data and data associated with the value card account to identify the notification event.

In one or more embodiments, when monitoring location data and data associated with the value card account to identify the notification event, the processor-executable instructions, when executed by the processor, further configure the processor to obtain, via the communications module and from a server, the data associated with the value card account; analyze the data associated with the value card account to determine that a transaction has been completed at a particular merchant; and responsive to determining that the transaction has been completed at the particular merchant, identify the notification event.

In one or more embodiments, the processor-executable instructions, when executed by the processor, configure the processor to determine a conversion rate of the digital wallet pass data based on at least one of the location data or the data associated with the value card account, wherein the notification includes a selectable option to apply the digital wallet pass data to the value card account at the determined conversion rate.

In one or more embodiments, the processor-executable instructions, when executed by the processor, configure the processor to receive, via the communications module and from the computing device, a signal indicating selection of the selectable option to apply the digital wallet pass data to the value card account at the determined conversion rate; and responsive to receiving the signal indicating selection of the selectable option to apply the digital wallet pass data to the value card account at the determined conversion rate, apply the digital wallet pass data to the value card account based on the determined conversion rate.

In one or more embodiments, when monitoring location data and data associated with the value card account to identify the notification event, the processor-executable instructions, when executed by the processor, further configure the processor to receive, via the communications module and from the computing device, the location data, the location data identifying a location of the computing device; engage an application programming interface to analyze the location data to determine that the location of the computing device is within a threshold distance of a particular merchant; and responsive to determining that the location of the computing device is within the threshold distance of the particular merchant, identify the notification event.

In one or more embodiments, the notification includes a selectable option to apply the digital wallet pass data to offset a future transaction at the particular merchant.

In one or more embodiments, the processor-executable instructions, when executed by the processor, configure the processor to receive, via the communications module and from the computing device, a signal indicating selection of the selectable option to offset the future transaction at the particular merchant; and responsive to receiving the signal indicating selection of the selectable option to offset the future transaction at the particular merchant, send, via the communications module and to the computing device, a signal causing the computing device to display a machine-readable code associated with the digital wallet pass data.

In one or more embodiments, the digital wallet pass data includes digital gift card data and the notification event is identified based at least on the location data.

In one or more embodiments, the digital wallet pass data includes loyalty point data and the notification event is identified based at least on the data associated with the value card account.

In another aspect there is provided a computer-implemented method comprising receiving, via a communications module and from a computing device, a signal including digital wallet pass data; storing the digital wallet pass data in association with an account; monitoring location data and data associated with a value card account to identify a notification event; responsive to identifying the notification event, generating a notification based on the digital wallet pass data; and sending, via the communication module and to the computing device, a signal causing the computing device to display the notification.

In one or more embodiments, the method further comprises engaging an application programming interface to analyze at least one of the location data and data associated with the value card account to identify the notification event.

In one or more embodiments, monitoring location data and data associated with the value card account to identify the notification event comprises obtaining, via the communications module and from a server, the data associated with the value card account; analyzing the data associated with the value card account to determine that a transaction has been completed at a particular merchant; and responsive to determining that the transaction has been completed at the particular merchant, identifying the notification event.

In one or more embodiments, the method further comprises determining a conversion rate of the digital wallet pass data based on at least one of the location data or the data associated with the value card account, wherein the notification includes a selectable option to apply the digital wallet pass data to the value card account at the determined conversion rate.

In one or more embodiments, the method further comprises receiving, via the communications module and from the computing device, a signal indicating selection of the selectable option to apply the digital wallet pass data to the value card account at the determined conversion rate; and responsive to receiving the signal indicating selection of the selectable option to apply the digital wallet pass data to the value card account at the determined conversion rate, applying the digital wallet pass data to the value card account based on the determined conversion rate.

In one or more embodiments, monitoring location data and data associated with the value card account to identify the notification event comprises receiving, via the communications module and from the computing device, the location data, the location data identifying a location of the computing device; engaging an application programming interface to analyze the location data to determine that the location of the computing device is within a threshold distance of a particular merchant; and responsive to determining that the location of the computing device is within the threshold distance of the particular merchant, identifying the notification event.

In one or more embodiments, the notification includes a selectable option to apply the digital wallet pass data to offset a future transaction at the particular merchant.

In one or more embodiments, the method further comprises receiving, via the communications module and from the computing device, a signal indicating selection of the selectable option to offset the future transaction at the particular merchant; and responsive to receiving the signal indicating selection of the selectable option to offset the future transaction at the particular merchant, sending, via the communications module and to the computing device, a signal causing the computing device to display a machine-readable code associated with the digital wallet pass data.

In one or more embodiments, at least one of the digital wallet pass data includes digital gift card data and the notification event is identified based at least on the location data or the digital wallet pass data includes loyalty point data and the notification event is identified based at least on the data associated with the value card account.

In another aspect there is provided a non-transitory computer readable storage medium comprising computer-executable instructions which, when executed, configure a processor to receive, via a communications module and from a computing device, a signal including digital wallet pass data; store the digital wallet pass data in association with an account; monitor location data and data associated with a value card account to identify a notification event; responsive to identifying the notification event, generate a notification based on the digital wallet pass data; and send, via the communication module and to the computing device, a signal causing the computing device to display the notification.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 is a computer system. The computing device 110 may be, for example, a smartphone as shown. The computing device 110 may, however, be a computing device of another type such as for example a personal computer, a laptop computer, a tablet computer, a notebook computer, a hand-held computer, a personal digital assistant, a portable navigation device, a mobile phone, a smart phone, a wearable computing device (e.g. a smart watch, a wearable activity monitor, wearable smart jewelry, a glasses and other optical devices that include optical head-mounted displays), and any other type of computing device that may be configured to store data and software instructions, and execute software instructions to perform operations consistent with disclosed embodiments. In certain embodiments, the computing device 110 may be adapted to present a graphical user interface that allows for communication with the server computer system 120.

The server computer system 120 may be associated with a financial institution. The financial institution may be a digital wallet provider. The server computer system 120 may include a database that stores data associated with value card accounts. For example, a value card account may be associated with a credit card and the data associated with the value card account may include a list of transactions made on the credit card. The list of transactions may include information related to the transactions such as for example a transaction location, a transaction date, a transaction amount, etc.

In this embodiment, the server computer system 120 also includes a database that stores digital wallet pass data. The digital wallet pass data may be associated with an account of the user. The account of the user may be a digital wallet account or may be the value card account of the user. As one example, the server computer system 120 may include a database that stores loyalty point data and digital gift card data. The loyalty point data may include, for example, authentication information (username/password) used to access a loyalty point account of the user and may also include a name of a provider of the loyalty points. The digital gift card data may include, for example, a gift card number, an access code of the gift card, a type of the gift card (e.g. a name of a merchant associated with the gift card) etc. As will be described in more detail below, responsive to identifying a notification event, the server computer system 120 may generate notifications based on the digital wallet pass data.

The server computer system 120 is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

Although the server computer system 120 is described as being associated with a financial institution that may be a digital wallet provider, in another embodiment the server computer system 120 may be associated with a digital wallet provider that is not a financial institution.

The system may additionally include one or more third party servers and the server computer system 120 may communicate with the one or more third party servers to obtain, for example, data associated with value card accounts, data associated with loyalty point accounts, data associated with digital gift cards, etc. The data associated with value card accounts may include transaction data. The data associated with loyalty point accounts may include a loyalty point balance. The data associated with digital gift cards may include a digital gift card balance. The server computer system 120 may engage one or more APIs to communicate with the one or more third party servers. The server computer system 120 may store data associated with the one or more third party servers in one or more databases. The data associated with the one or more third party servers may be used to access one or more accounts hosted by the one or more third party servers. For example, the server computer system 120 may store authentication information that may be used to access an account hosted by a third party server.

Figure 2:
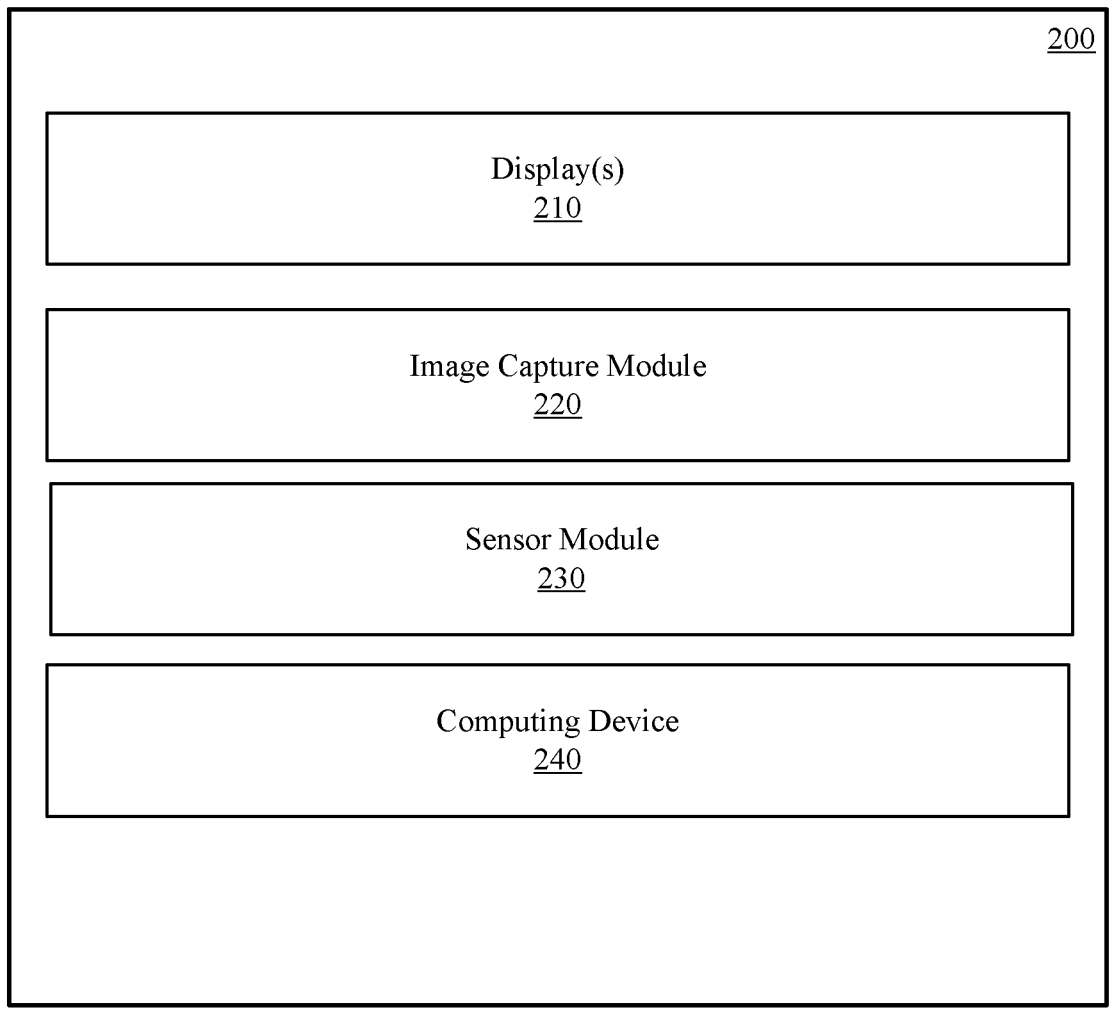
FIG. 2 is a simplified schematic diagram showing components of a computing device.

FIG. 2 is a simplified schematic diagram showing component of an exemplary computing device 200. Computing device 110 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the server computer system 120 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
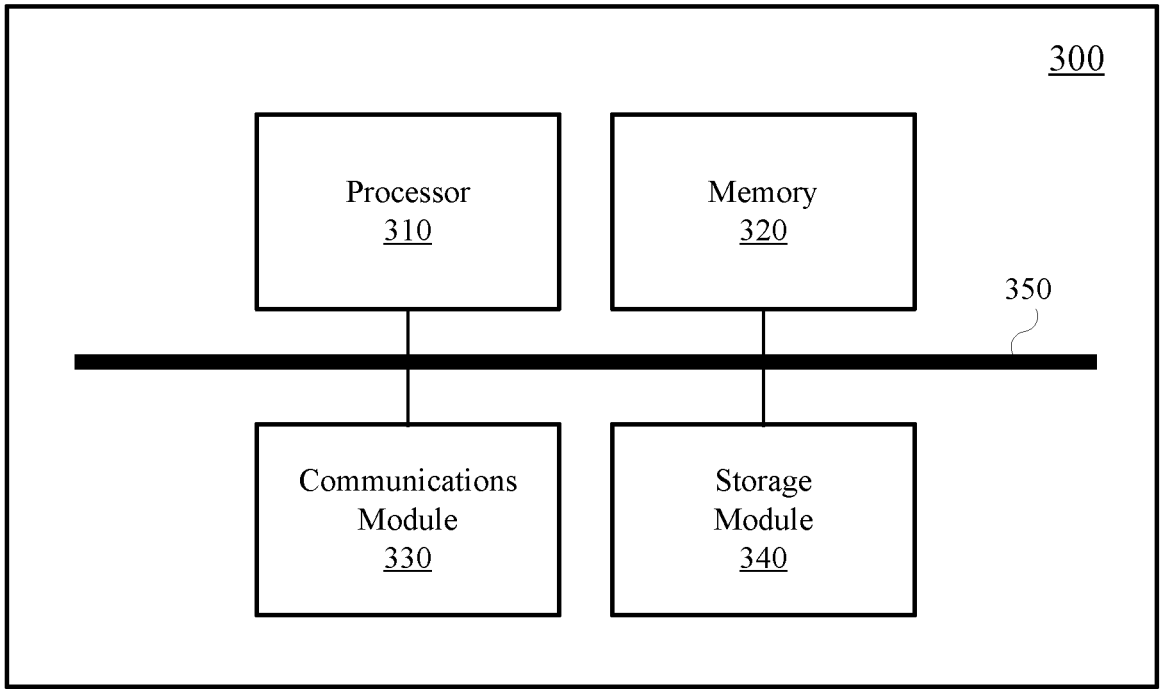
FIG. 3 is a high-level schematic diagram of an example computing device.

Referring now to FIG. 3, a high-level operation diagram of an example computer device 300 is shown. In some embodiments, the computer device 300 may be exemplary of the computer device 240 (FIG. 2) and/or the server computer system 120.

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
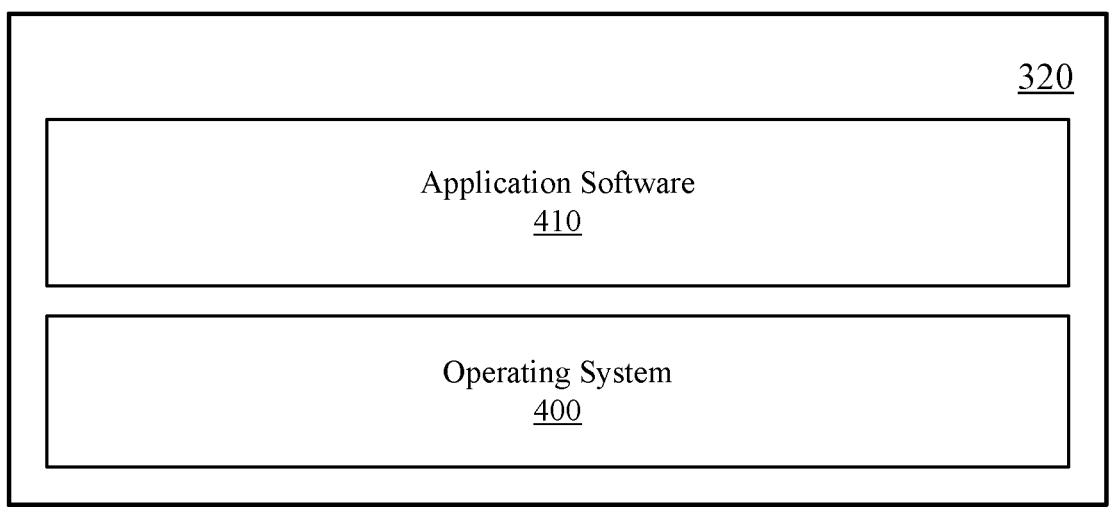
FIG. 4 shows a simplified organization of software components stored in a memory of the example computing device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2) and/or the server computer system 120.

While a single application 410 is illustrated in FIG. 3, in operation the memory 320 may include more than one application 410 and different applications 410 may perform different operations. For example, in at least some embodiments in which the computer device 300 is functioning as the computing device 110, the applications 410 may include a banking application. The banking application may be configured for secure communications with the server computer system 120 and may provide various banking functions such as, for example, the ability to display a quantum of value in one or more data records (e.g. display balances), configure or request that operations such as transfers of value (e.g. bill payments, email money transfers and other transfers) be performed, and other account management functions.

As another example, in at least some embodiments in which the computer device 300 functions as the computing device 110, the applications 410 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

As yet another example, in at least some embodiments in which the computer device 300 functions as the computing device 110, the applications 410 may include an electronic messaging application. The electronic messaging application may be configured to display a received electronic message such as an email message, short messaging service (SMS) message, or a message of another type. In at least some embodiments, the server computer system 120 may be configured, through computer-executable instructions, to send an electronic message to the computing device 110. For example, the server computer system 120 may be configured to send a SMS message to a phone number associated with a user and an electronic messaging application on the computing device 110 may be configured to retrieve the message and display the message to the user. As another example, the server computer system 120 may be configured to send an email message to an email address associated with a user and an email application on the computing device 110 may be configured to retrieve the message and display the message to the user.

As yet another example, in at least some embodiments in which the computer device 300 is functioning as the computing device 110, the applications 410 may include a digital wallet application. The digital wallet application may be configured for secure communications with the server computer system 120 and may provide various digital wallet functions such as for example the ability to store payment information and passwords for payment methods. The digital wallet application may engage the communications module of the computing device 110 to complete payments using, for example, near-field communications. As will be described in more detail below, the digital wallet application may store digital wallet passes such as for example loyalty point accounts, digital gift cards, etc. and may generate notifications based on digital wallet pass data.

Figure 5:
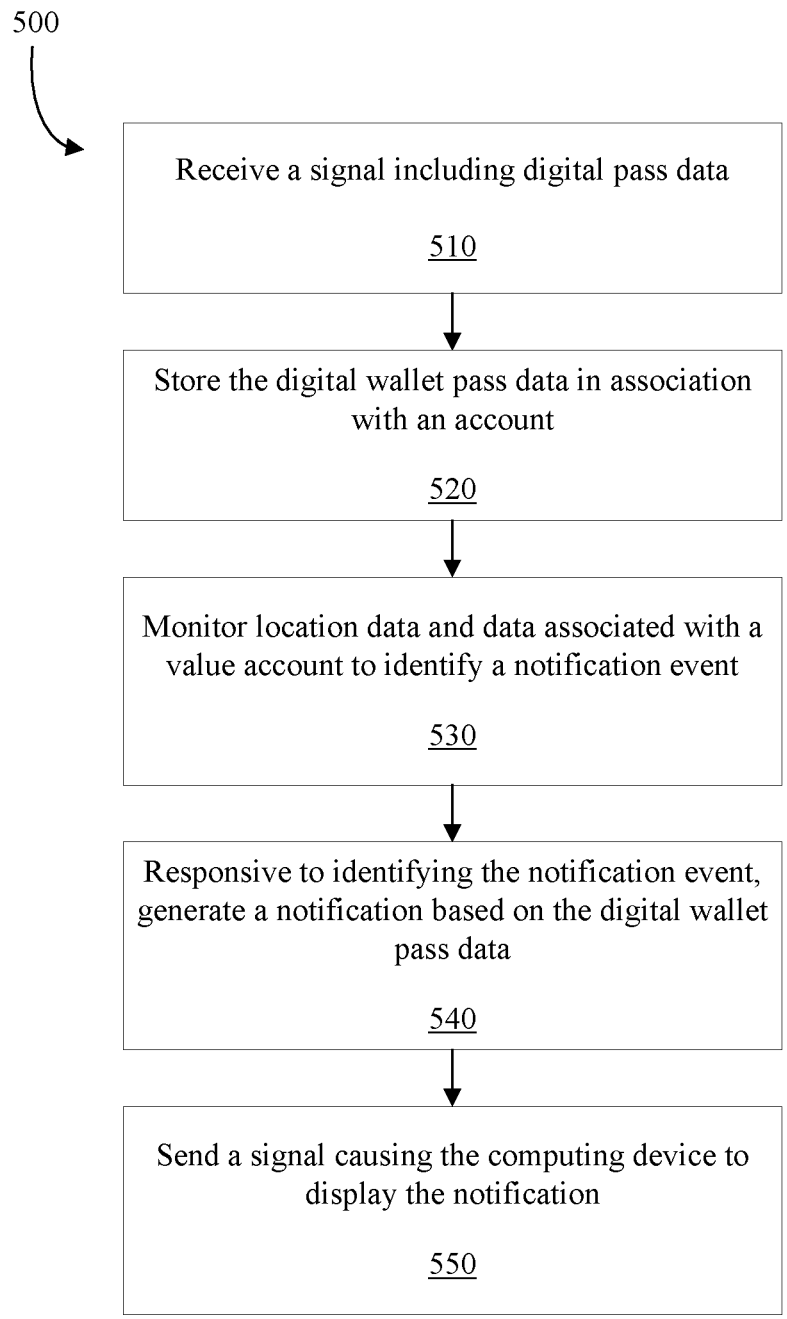
FIG. 5 is a flowchart showing operations performed by a server in generating notifications based on digital pass data according to an embodiment.

The server computer system 120 is configured to generate notifications based on digital wallet pass data. FIG. 5 is a flowchart showing operations performed by the server computer system 120 in generating notifications based on digital wallet pass data according to an embodiment. The operations may be included in a method 500 which may be performed by the server computer system 120. For example, computer-executable instructions stored in memory of the server computer system 120 may, when executed by one or more processors, configure the server computer system 120 to perform the method 500 or a portion thereof.

The server computer system 120 receives, via the communications module and from the computing device, a signal including digital wallet pass data (step 510). In this embodiment, the computing device may be the computing device 110.

In this embodiment, the digital wallet pass data includes digital gift card data and/or loyalty point data. The digital gift card data may be associated with a digital gift card and the loyalty point data may be associated with a loyalty point account.

Within the digital wallet application, a graphical user interface (GUI) may be provided that includes one or more selectable options to add one or more digital wallet passes to the digital wallet. Responsive to the user selecting the option to add one or more digital wallet passes to their digital wallet, the digital wallet application may display a GUI.

Figure 6:
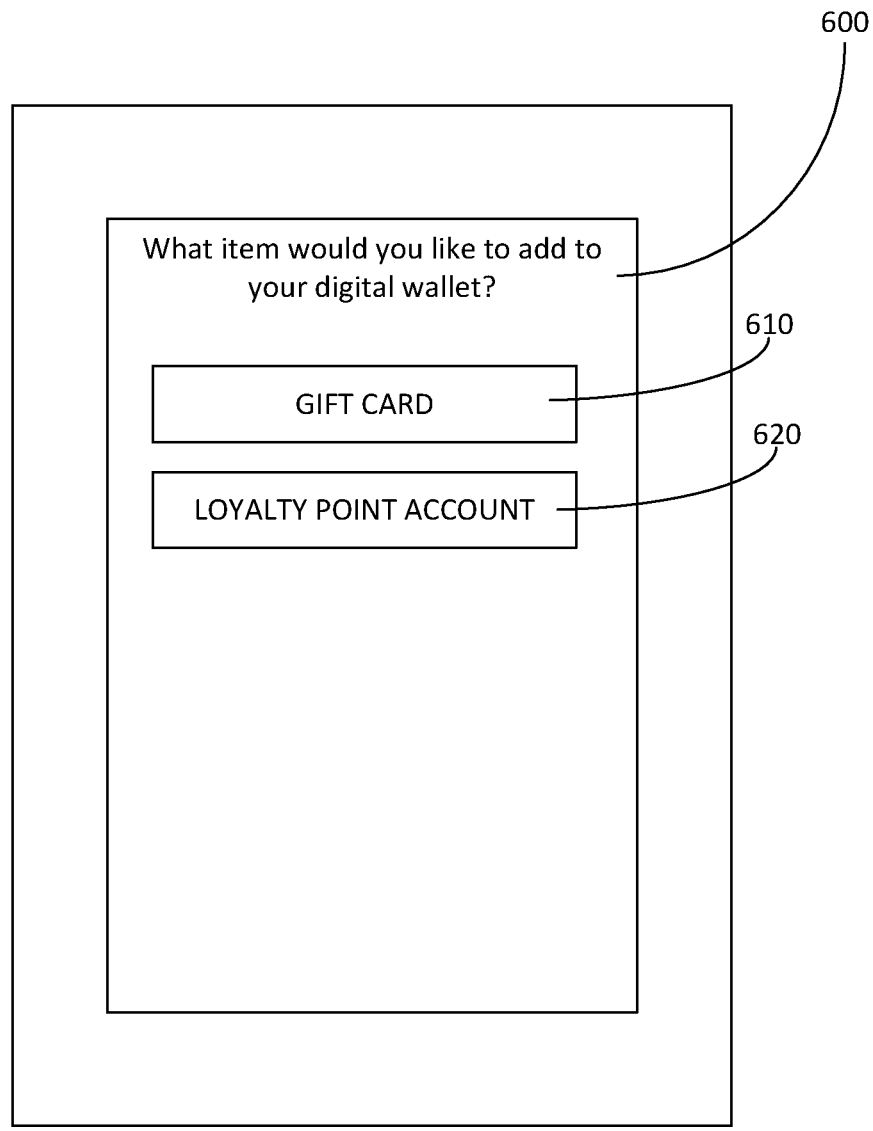
FIG. 6 is an example interface displayed on a display screen of a computing device according to an embodiment.

An example GUI 600 displayed on a display screen of the computing device 110 is shown in FIG. 6. As can be seen, the GUI 600 includes a first selectable option 610 that, when selected, displays a GUI having one or more input fields associated with digital gift card data. The digital gift card data may include, for example, a gift card number, an access code of the gift card, a type of the gift card (e.g. a name of a merchant associated with the gift card) etc. The GUI includes a second selectable option 620 that, when selected, displays a GUI having one or more input fields associated with loyalty point data. The loyalty point data may include, for example, authentication information (username/password) used to access a loyalty point account of the user and may also include a name of a provider of the loyalty points.

At least one of the input fields may include a drop-down menu. For example, the one or more input fields associated with digital gift card data may include a drop-down menu that includes a list of all types of gift cards that may be added to the digital wallet application. As another example, the one or more input fields associated with loyalty point data may include a drop-down menu that includes a list of all loyalty point providers that may be added to the digital wallet application.

Once the user has completed the one or more input fields, the user may select a selectable option to submit the digital wallet pass data. Responsive to the user selecting the selectable option, the computing device 110 sends a signal including the digital wallet pass data to the server computer system 120.

The digital wallet application may similarly allow a user to add one or more value cards to the digital wallet. For example, the digital wallet application may include a selectable option that, when selected by the user, displays a GUI having one or more input fields associated with credit card information. The credit card information may include a credit card number, credit card expiry date and card verification value (CVV) number. As another example, the digital wallet application may include a selectable option that, when selected by the user, displays a GUI having one or more input fields associated with authentication information (username/password) of a value card account of the user. As will be described, the server computer system 120 may engage an API associated with a value card provider and, using the authentication information, may obtain data associated with the value card account of the user.

The server computer system 120 stores the digital wallet pass data in association with an account (step 520).

In this embodiment, the account may be a digital wallet account and/or may be the value card account of the user. For example, during setup of the digital wallet application, the user may be prompted to create a digital wallet account and may be required to provide authentication information such as a username and password. Within the digital wallet application, the user may access their digital wallet account by entering their username and password. It will be appreciated that in some embodiments the digital wallet application may not require a username and password as the user may, for example, unlock the computing device 110 using facial recognition and this may allow the user to access their digital wallet account via the digital wallet application without any further authentication.

The server computer system 120 may communicate with a third party server associated with the digital wallet pass data to obtain additional data associated with the digital wallet pass data. For example, additional data for loyalty account data may include a loyalty point balance. Additional data for digital gift card data may include a digital gift card balance. The server computer system 120 may engage one or more APIs to communicate with the one or more third party servers to obtain the additional data. The server computer system 120 may store the additional data and the additional data may be sent to the computing device 110 and displayed within the digital wallet application. The server computer system 120 may obtain updated additional data (digital gift card balance and/or loyalty point balance) and this may be obtained responsive to the digital wallet application being opened on the computing device 110 or responsive to the user requesting updated additional data within the digital wallet application.

The additional data may be displayed within the digital wallet. For example, the digital wallet may include a graphical user interface configured to display all digital wallet passes active in the digital wallet. Each digital wallet pass may be displayed as an icon and the icon may include the additional data. For example, a digital gift card may be displayed with a logo of the associated merchant and the digital gift card balance may be displayed adjacent to the logo.

The server computer system 120 monitors location data and data associated with a value card account to identify a notification event (step 530).

In this embodiment, the notification event may be a pre-transaction event or a post-transaction event. A pre-transaction event is an event that may occur prior to a transaction being initiated on the value card account of the user. A post-transaction event is an event that may occur after a transaction has been completed on the value card account of the user. The location data and data associated with the value card account of the user may be monitored to identify a pre-transaction event or a post-transaction event.

Figure 7:
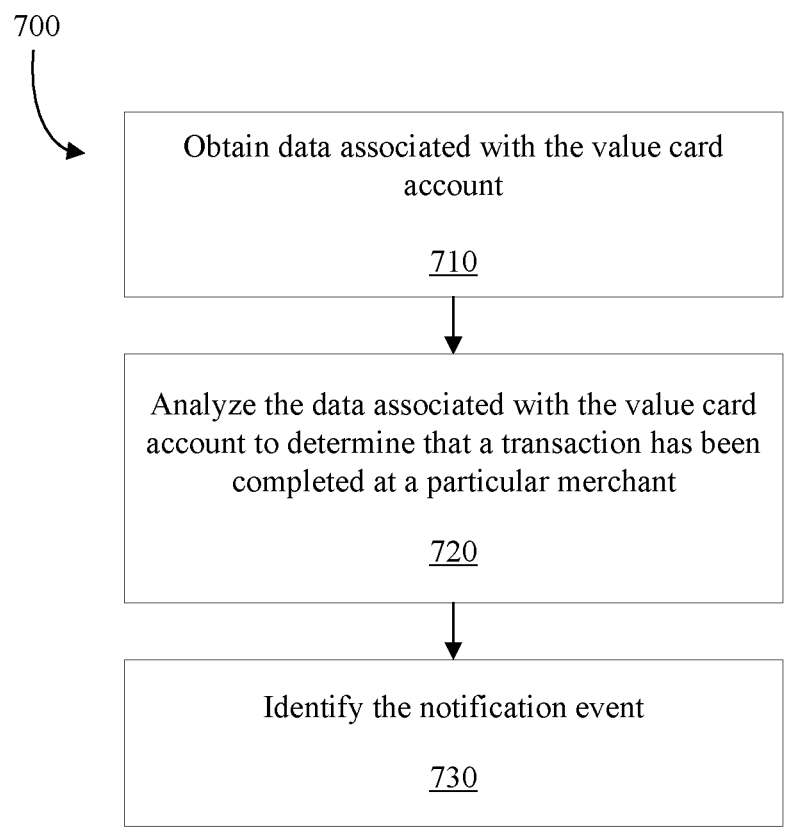
FIG. 7 is a flowchart showing operations performed by a server in identifying a notification event according to an embodiment.

As one example, data associated with the value card account may be monitored to identify the notification event. In this example, the notification event may be a post-transaction event. FIG. 7 is a flowchart showing operations performed by the server computer system 120 in identifying a notification event according to an embodiment. The operations may be included in a method 700 which may be performed by the server computer system 120. For example, computer-executable instructions stored in memory of the server computer system 120 may, when executed by one or more processors, configure the server computer system 120 to perform the method 700 or a portion thereof.

The server computer system 120 obtains, via the communications module and from a server, the data associated with the value card account (step 710).

In this embodiment, the data associated with the value card account includes a list of transactions made on the credit card. The list of transactions may include information related to the transactions such as for example a transaction location, a transaction date, a transaction amount, etc. In one or more embodiments, the server computer system 120 may obtain the data associated with the value card account from, for example, the database that stores data associated with value card accounts. In another embodiment, the server computer system 120 may obtain the data associated with the value card account through use of an API. For example, the server computer system 120 may store authentication information (username/password) associated with a value card account and, using the authentication information, the server computer system 120 may engage an API associated with the value card provider to obtain the data associated with the value card account.

The server computer system 120 analyzes the data associated with the value card account to determine that a transaction has been completed at a particular merchant (step 720).

In this embodiment, the data associated with the value card account is analyzed to identify the merchant who conducted the transaction. The server computer system 120 may compare the identified merchant to, for example, a list of partner merchants who are eligible for loyalty point redemption. When the merchant who conducted the transaction is found in the list of partner merchants, the server computer system 120 determines that the transaction has been completed at the particular merchant.

Responsive to determining that the transaction has been completed at the particular merchant, the server computer system 120 identifies the notification event (step 730). When it is determined that the transaction has been completed at the particular merchant, the server computer system 120 identifies the notification event. The notification event is identified after the transaction has been completed and as such the notification event is a post-transaction event.

Figure 8:
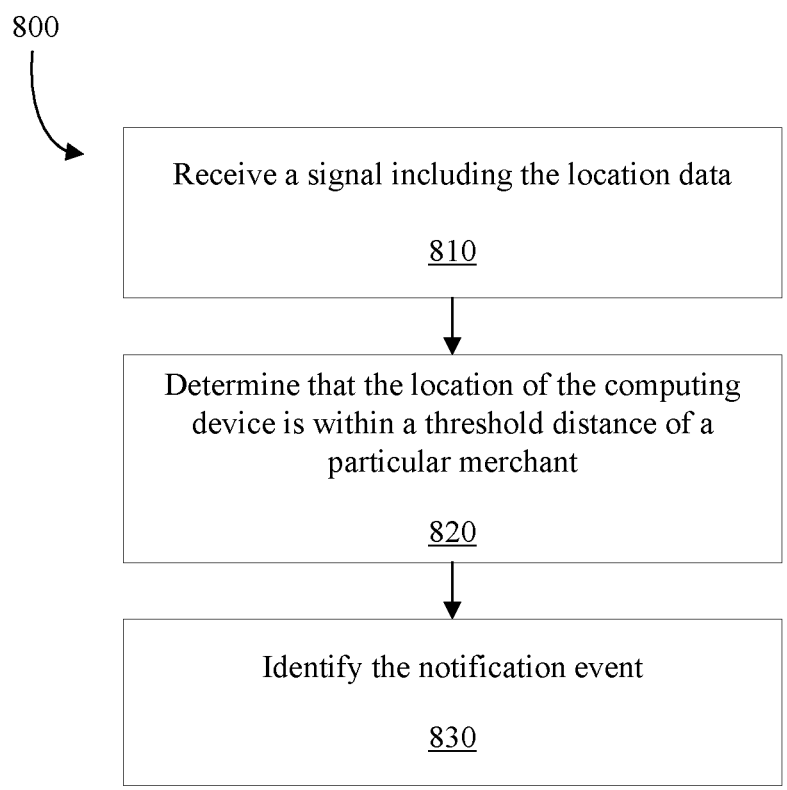
FIG. 8 is a flowchart showing operations performed by a server in identifying a notification event according to an embodiment.

As another example, location data may be monitored to identify the notification event. In this example, the notification event may be a pre-transaction event. FIG. 8 is a flowchart showing operations performed by the server computer system 120 in identifying a notification event according to an embodiment. The operations may be included in a method 800 which may be performed by the server computer system 120. For example, computer-executable instructions stored in memory of the server computer system 120 may, when executed by one or more processors, configure the server computer system 120 to perform the method 800 or a portion thereof.

The server computer system 120 receives, via the communications module and from the computing device, a signal including the location data, the location data identifying a location of the computing device (step 810). In this embodiment, the computing device 110 may engage a location subsystem which generates location data identifying the location of the computing device 110. The location may be the current geographic location of the computing device 110. The location of the computing device 110 is assumed to be the current geographic location of the user.

The server computer system 120 determines that the location of the computing device is within a threshold distance of a particular merchant (step 820). In this embodiment, the particular merchant may be a merchant associated with one or more digital gift cards stored in the digital wallet application.

Using the location of the computing device 110, the server computer system 120 determines if the user is within the threshold distance of a particular merchant. The particular merchant may be identified using, for example, a geographic location of the merchant. The threshold distance may be associated with a geofence representing a virtual boundary set up around the boundary of the geographic location of the merchant. The server computer system 120 may engage one or more APIs such as for example Google Maps API or Geofencing API. The threshold distance may be selected such that the server 120 determines that the computing device 110, and thus the user, is located at the merchant. For example, the computing device 110, and thus the user, may be inside a particular store.

In another embodiment, the server computer system 120 may identify a merchant within a threshold distance of the computing device 110. The server computer system 120 may compare the identified merchant to, for example, a list of partner merchants who are eligible for loyalty point redemption.

Responsive to determining that the location of the computing device is within the threshold distance of the particular merchant, the server computer system 120 identifies the notification event (step 830).

As mentioned, the particular merchant may be a merchant associated with one or more digital gift cards stored in the digital wallet application. When it is determined that the computing device 110, and thus the user, is located within the threshold distance of the particular merchant, the server computer system 120 identifies the notification event. The notification event is identified prior to the user initiating a transaction at the particular merchant and as such the notification event is a pre-transaction notification event.

In embodiments where the server computer system 120 compares the identified merchant to the list of partner merchants who are eligible for loyalty point redemption, the notification event is identified when the identified merchant is found in the list of partner merchants.

Responsive to identifying the notification event, the server computer system 120 generates a notification based on the digital wallet pass data (step 540).

As mentioned, in this embodiment the digital wallet pass data may include loyalty point data and/or digital gift card data. The notification events may include pre-transaction notification events and post-transaction notification events.

A post-transaction notification event may cause the server computer system 120 to generate a notification based on the loyalty point data. For example, where a transaction has been completed at a merchant that is eligible for loyalty point redemption, the notification may be based on the loyalty point data.

A pre-transaction notification event may cause the server computer system 120 to generate a notification based on the digital gift card data. For example, when it is determined that the computing device 110 is within a threshold distance of a particular merchant associated with one or more digital gift cards stored in the digital wallet application, the notification may be based on digital gift card data.

A pre-transaction notification event may cause the server computer system 120 to generate a notification based on the loyalty point data. For example, when it is determined that the computing device 110 is within a threshold distance of a particular merchant that is eligible for loyalty point redemption, the notification may be based on the loyalty point data.

The server computer system 120 sends, via the communications module and to the computing device, a signal causing the computing device to display the notification (step 550).

In response to receiving the signal, the computing device 110 may display the notification within the digital wallet application. As another example, the notification may be displayed in a notification center of an operating system executing on the computing device 110. In this example, the notification may be displayed within a lock screen of the computing device 110. In this manner, the user may see the notification on the computing device 110 without having to unlock their phone and without having to open the digital wallet application.

In one or more embodiments, the notification may include one or more selectable options. For example, the notification may include a selectable option that, when selected, applies the digital wallet pass data to the value card account of the user. Further, the notification may include a conversion rate of the digital wallet pass data and the conversion rate may be included with the notification.

Figure 9:
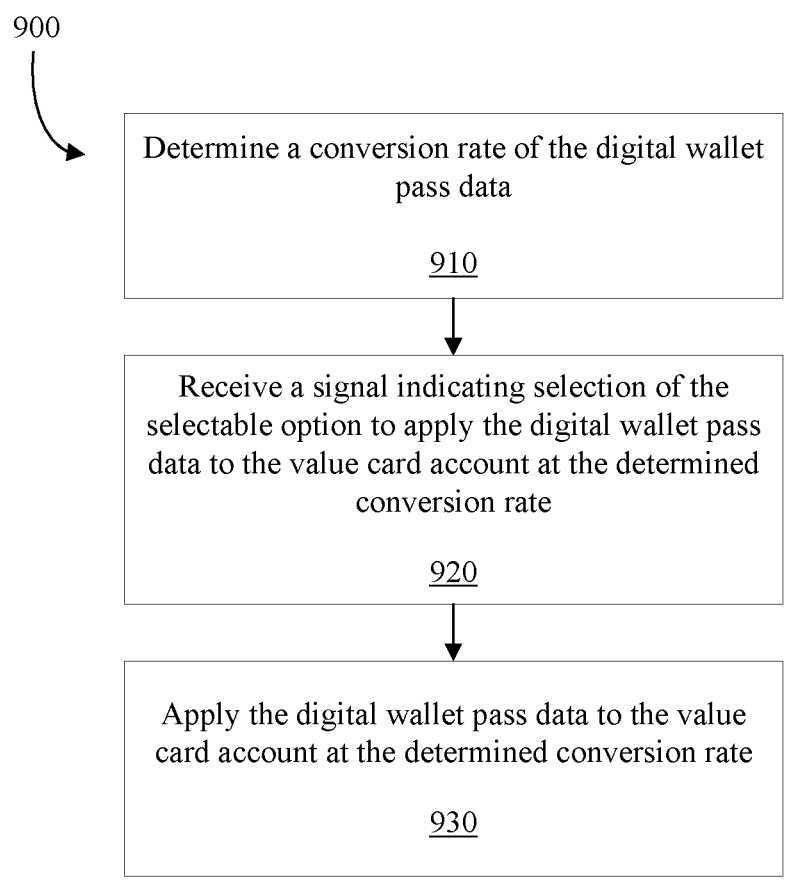
FIG. 9 is a flowchart showing operations performed by a server in applying digital wallet pass data to a value card account according to an embodiment.

FIG. 9 is a flowchart showing operations performed by the server computer system 120 in applying the digital wallet pass data to the value card account of the user according to an embodiment. The operations may be included in a method 900 which may be performed by the server computer system 120. For example, computer-executable instructions stored in memory of the server computer system 120 may, when executed by one or more processors, configure the server computer system 120 to perform the method 900 or a portion thereof.

The server computer system 120 determines a conversion rate of the digital wallet pass data (step 910). In this embodiment, the conversion rate is a redemption rate for the loyalty points. For example, the conversion rate may be 1000 points=$1. As such, for every 1000 loyalty points, the user may apply $1 to the value card account. In this manner, the cost associated with a transaction completed at a particular merchant may be reduced or offset by applying loyalty points to the value card account.

The conversion rate may be based on the particular merchant. For example, when a particular merchant has been identified, such as during step 720 of method 700 described herein, the server computer system 120 may perform a lookup to determine a conversion rate for the particular merchant. The particular merchant may be a partner merchant and as such the conversion rate may be less than the conversion rate of a merchant who is not a partner merchant. For example, the partner merchant may have a conversion rate of 500 points=$1 and a merchant that is not a partner merchant may have a conversion rate of 1000 points=$1.

The notification sent during step 550 of method 500 may include a selectable option to apply the digital wallet pass data to the value card account at the determined conversion rate.

The server computer system 120 receives, via the communications module and from the computing device 110, a signal indicating selection of the selectable option to apply the digital wallet pass data to the value card account at the determined conversion rate (step 920).

The user may select the selectable option to apply the digital wallet pass data to the value card account to reduce or offset the cost associated with a transaction. In this manner, the user may complete a purchase at a particular merchant. The user may be unaware that they have loyalty points that may be applied to offset or reduce the cost of the purchase. The user may also be unaware that the merchant has a reduced conversion rate. As such, when the server computer system 120 determines that the transaction has been completed, the server computer system 120 sends the notification to the computing device 110 and the user may select the selectable option to automatically apply loyalty points, at the conversion rate, to the value card account to reduce or offset the cost of the transaction.

The server computer system 120 applies the digital wallet pass data to the value card account at the determined conversion rate (step 930). Responsive to receiving the signal indicating selection of the selectable option, the server computer system 120 applies the digital wallet pass data to the value card account at the determined conversion rate. For example, the server computer system 120 may send a signal to reduce or deduct loyalty points from the loyalty points account of the user. The signal may be sent, for example, to a third party server associated with the loyalty point provider and this may be done using the API associated with the loyalty point provider. The server computer system 120 may, based on the conversion rate, convert the loyalty points to dollars and may send a signal to apply the dollar amount to the value card account. For example, the signal may be sent to the database associated with the value card account. As another example, the signal may be sent to a third party server associated with the value card account and this may be done using the API associated with the value card account.

Figure 10:
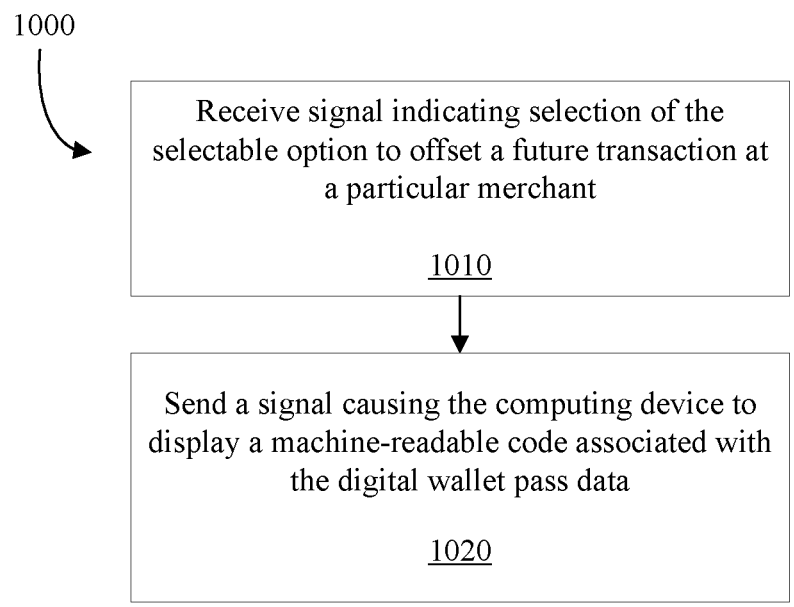
FIG. 10 is a flowchart showing operations performed by a server in sending a signal causing a computing device to display a machine-readable code associated with digital wallet pass data according to an embodiment.

As another example, the notification may include a selectable option that, when selected, causes the computing device 110 to display a machine-readable code associated with the digital wallet pass data. FIG. 10 is a flowchart showing operations performed by the server computer system 120 in causing the computing device to display a machine-readable code associated with the digital wallet pass data according to an embodiment. The operations may be included in a method 1000 which may be performed by the server computer system 120. For example, computer-executable instructions stored in memory of the server computer system 120 may, when executed by one or more processors, configure the server computer system 120 to perform the method 1000 or a portion thereof.

The server computer system 120 receives, via the communications module and from the computing device, a signal indicating selection of the selectable option to offset a future transaction at a particular merchant (step 1010).

In this embodiment, the particular merchant may be a merchant associated with one or more digital gift cards stored in the digital wallet application. As such, the notification includes a selectable option to offset a future transaction at the particular merchant. The user may select the selectable option on the computing device 110 and this may indicate that the user would like to user their gift card for the future transaction at the particular merchant.

The server computer system 120 sends, via the communications module and to the computing device 110, a signal causing the computing device to display a machine-readable code associated with the digital wallet pass data (step 1020).

The machine-readable code associated with the digital wallet pass data may be generated by the server computer system 120. The machine-readable code may be in the form of a Quick Response (QR) code, barcode, or other machine-readable code that, when scanned by a scanning device, provides information to the scanning device regarding the digital wallet pass data. For example, a QR code may be associated with a digital gift card and as such the QR code may be displayed on the computing device 110 and scanned by a scanning device to offset or reduce the cost of a transaction at the particular merchant.

Once the digital gift card has been used to complete the transaction, the server computer system 120 may obtain an updated digital gift card balance. The updated digital gift card balance may be displayed within the digital wallet application. In embodiments where the updated digital gift card balance is equal to $0, the server computer system 120 may send a signal that causes the computing device to display a notification indicating that the gift card balance is $0. The notification may include a selectable option that, when selected, removes the digital gift card from the digital wallet application. The notification may also include a selectable option that, when selected, re-loads the gift card using a value card of the user.

Although in embodiments digital gift card data is described as being entered manually by a user within the digital wallet application, other methods may be used. For example, the digital wallet application may include a selectable option that, when selected, activates a camera associated with the computing device 110. The user may be instructed to capture an image of a physical gift card, the image including a machine-readable code found on the physical gift card. The image may be stored and, responsive to a notification event, may be displayed on a display screen of the computing device 110 in manners similar to that described herein. As another example, the camera associated with the computing device 110 may be used to scan the machine-readable code found on the physical gift card and the server computer system 120 may generate a digital gift card based on information retrieved from the scanned machine-readable code. The digital gift card may be stored and, responsive to a notification event, may be displayed on a display screen of the computing device 110 in manners similar to that described herein. As another example, a user may receive a digital gift card as a gift. The gift card may be received in an email message. In this example, the email message may include a selectable option to add the digital gift card to the digital wallet.

Although in at least some embodiments described herein notifications are described as including a selectable option to apply loyalty points to a value card account, it will be appreciated that other notifications may be generated and sent. For example, a user may be close to earning a threshold amount of loyalty points for a particular loyalty point provider. When it is determined that the user is within a threshold distance of a partner merchant (or a threshold distance of the loyalty point provider), the notification may inform the user that they are within the threshold distance that that they are close to the threshold amount of loyalty points. The notification may display an amount of money that is required to be spent to earn the threshold amount of loyalty points. For example, a user may be a "silver member" of a loyalty point program and this may indicate that the user has earned between 5,000 and 10,000 points. The user may have earned 9980 points within the past year and as such are only 20 points away from becoming a "gold member". As such, the notification may indicate that the user is only 20 points away from becoming a "gold member" and that the user can become a "gold member" by spending $10 dollars at the partner merchant. The notification may also include recommendations for items that the user may be interested in purchasing at the partner merchant to become the "gold member" and these recommendations may be generated based on analyzing historical transaction data of the value card account of the user. As another example, the notification may indicate that the user is within a threshold distance of a partner merchant that has a promotion to earn increased loyalty points.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
a communications module;
a processor in communication with the communications module over a communication bus; and
a memory in communication with the processor over the communication bus and storing processor-executable instructions which, when executed by the processor, configure the processor to:
determine, by engaging at least one application programming interface, that a computing device is within a threshold distance of a geofence representing a virtual boundary set up around a geographic location of a merchant;

responsive to determining that the computing device is within the threshold distance of the geofence representing the virtual boundary set up around the geographic location of the merchant, identify a notification event for at least one digital wallet pass active in a digital wallet application resident on the computing device;

responsive to identifying the notification event, generate a notification based on the at least one digital wallet pass, the notification including a selectable option to apply the at least one digital wallet pass to offset a future transaction at the merchant;

send, via the communications module and to the computing device, a signal causing the computing device to display the notification;

receive, via the communications module and from the computing device, a signal indicating selection of the selectable option to apply the at least one digital wallet pass to offset the future transaction at the merchant; and responsive to receiving the signal indicating selection of the selectable option to apply the at least one digital wallet pass to offset the future transaction at the merchant, send, via the communications module and to the computing device, a signal causing the computing device to display a machine-readable code associated with the at least one digital wallet pass.

2. The computer server system of claim 1, wherein the processor-executable instructions, when executed by the processor, configure the processor to:

obtain real-time data associated with the at least one digital wallet pass active in the digital wallet application.

3. The computer server system of claim 1, wherein the processor-executable instructions, when executed by the processor, configure the processor to:

engage another application programming interface to analyze data associated with a value card account to identify another notification event.

4. The computer server system of claim 1, wherein the processor-executable instructions, when executed by the processor, further configure the processor to:

analyze data associated with a value card account to determine that a transaction has been completed at a particular merchant; and responsive to determining that the transaction has been completed at the particular merchant, identify another notification event.

5. The computer server system of claim 1, wherein the notification includes another selectable option to apply the at least one digital wallet pass to a value card account.

6. The computer server system of claim 1, wherein the at least one digital wallet pass includes a digital gift card.

7. The computer server system of claim 1, wherein the at least one digital wallet pass includes a digital loyalty point card.

8. The computer server system of claim 1, wherein the merchant includes a merchant associated with the at least one digital wallet pass.

9. The computer server system of claim 1, wherein the processor-executable instructions, when executed by the processor, further configure the processor to:

determine that the at least one digital wallet pass has been used to complete the future transaction at the merchant;

obtain an updated balance of the at least one digital wallet pass; and send, via the communications module and to the computing device, a signal causing the computing device to display the updated balance of the at least one digital wallet pass.

10. The computer server system of claim 1, wherein the machine-readable code includes at least one of a Quick Response (QR) code or a barcode.

11. A computer-implemented method comprising:

determining, by engaging at least one application programming interface, that a computing device is within a threshold distance of a geofence representing a virtual boundary set up around a geographic location of a merchant;

responsive to determining that the computing device is within the threshold distance of the geofence representing the virtual boundary set up around the geographic location of the merchant, identifying a notification event for at least one digital wallet pass active in a digital wallet application resident on the computing device;

responsive to identifying the notification event, generating a notification based on the at least one digital wallet pass, the notification including a selectable option to apply the at least one digital wallet pass to offset a future transaction at the merchant;

sending, via a communications module and to the computing device, a signal causing the computing device to display the notification;

receiving, via the communications module and from the computing device, a signal indicating selection of the selectable option to apply the at least one digital wallet pass to offset the future transaction at the merchant; and responsive to receiving the signal indicating selection of the selectable option to apply the at least one digital wallet pass to offset the future transaction at the merchant, sending, via the communications module and to the computing device, a signal causing the computing device to display a machine-readable code associated with the at least one digital wallet pass.

12. The computer-implemented method of claim 11, further comprising:

obtaining real-time data associated with the at least one digital wallet pass active in the digital wallet application.

13. The computer-implemented method of claim 11, further comprising:

engaging another application programming interface to analyze data associated with a value card account to identify another notification event.

14. The computer-implemented method of claim 11, further comprising:

analyzing data associated with a value card account to determine that a transaction has been completed at a particular merchant; and responsive to determining that the transaction has been completed at the particular merchant, identifying another notification event.

15. The computer-implemented method of claim 11, wherein the notification includes another selectable option to apply the at least one digital wallet pass to a value card account.

16. The computer-implemented method of claim 11, wherein the at least one digital wallet pass includes a digital gift card or a digital loyalty point card.

17. The computer-implemented method of claim 11, wherein the merchant includes a merchant associated with the at least one digital wallet pass.

18. The computer-implemented method of claim 11, further comprising:
  determining that the at least one digital wallet pass has been used to complete the future transaction at the merchant;
  obtaining an updated balance of the at least one digital wallet pass; and
  sending, via the communications module and to the computing device, a signal causing the computing device to display the updated balance of the at least one digital wallet pass.

19. The computer-implemented method of claim 11, wherein the machine-readable code includes at least one of a Quick Response (QR) code or a barcode.

20. A non-transitory computer readable storage medium comprising computer-executable instructions which, when executed, configure a processor to:
  determine, by engaging at least one application programming interface, that a computing device is within a threshold distance of a geofence representing a virtual boundary set up around a geographic location of a merchant;
  responsive to determining that the computing device is within the threshold distance of the geofence representing the virtual boundary set up around the geographic location of the merchant, identify a notification event for at least one digital wallet pass active in a digital wallet application resident on the computing device;
  responsive to identifying the notification event, generate a notification based on the at least one digital wallet pass;
  send, via a communications module and to the computing device, a signal causing the computing device to display the notification;
  receive, via the communications module and from the computing device, a signal indicating selection of the selectable option to apply the at least one digital wallet pass to offset the future transaction at the merchant; and
  responsive to receiving the signal indicating selection of the selectable option to apply the at least one digital wallet pass to offset the future transaction at the merchant, send, via the communications module and to the computing device, a signal causing the computing device to display a machine-readable code associated with the at least one digital wallet pass.

* * * * *